Figures 1, 2:
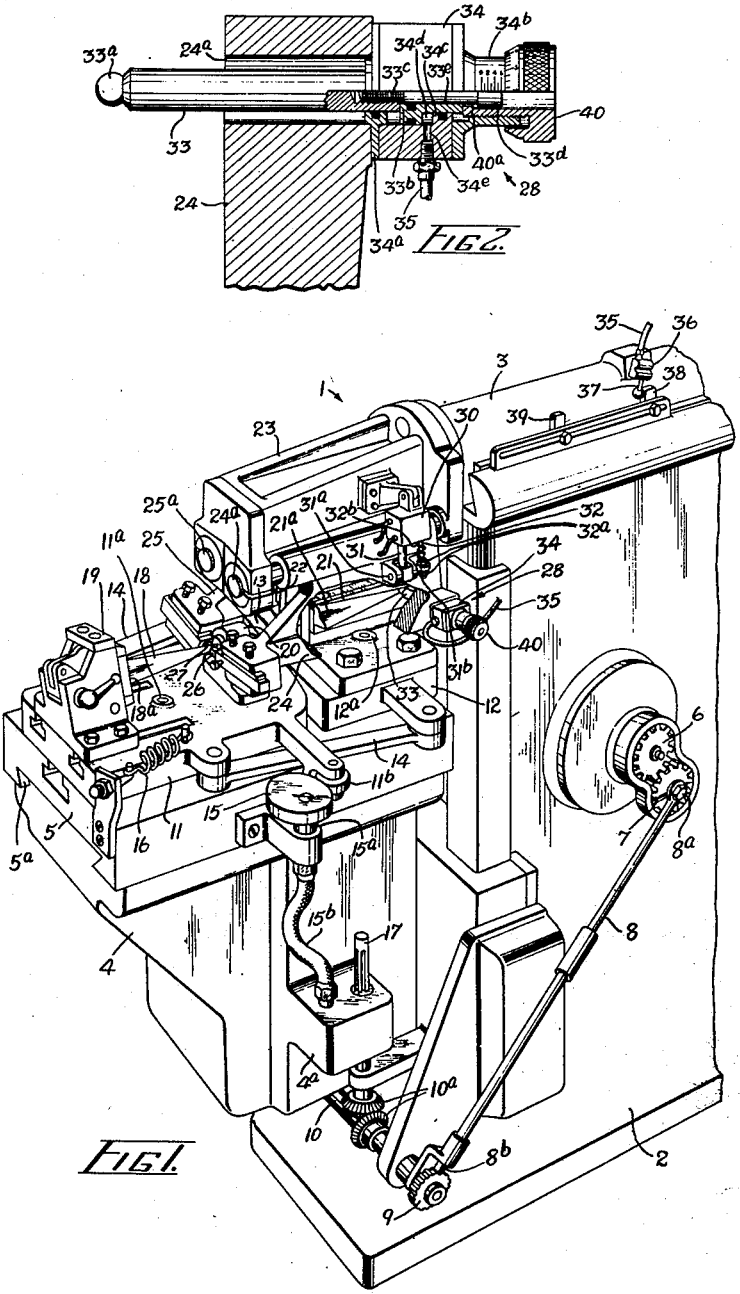

April 27, 1954    J. O. CREEK ET AL    2,676,521

PATTERN CONTROLLED MACHINE TOOL

Filed Feb. 26, 1952

INVENTORS
J.O.CREEK
E.W.DAWSON
PER
ATTORNEY

Patented Apr. 27, 1954

2,676,521

UNITED STATES PATENT OFFICE 2,676,521

PATTERN CONTROLLED MACHINE TOOL

John Oliver Creek, Brampton, Ontario, and Edward William Dawson, Toronto, Ontario, Canada, assignors to A. V. Roe Canada Limited, Malton, Ontario, Canada, a corporation Application February 26, 1952, Serial No. 273,445

6 Claims. (Cl. 90—24.3)

This invention relates to a tracer for pattern controlled machine tools.

This invention more particularly relates to machine tools having means for supporting a cutter in engagement with a workpiece and for supporting a tracer in engagement with a pattern. In such machine tools, the tracer is caused to travel over the pattern, and the tracer moves its supporting means in response to changes in the shape of the pattern. The movement of the supporting means causes corresponding movement of the cutter, and the cutter therefore machines the workpiece to a configuration determined by the pattern. It is an object of this invention to provide improved means for changing the position of the cutter relative to the workpiece while maintaining the tracer in engagement with the pattern.

In many pattern controlled machine tools, such as shapers or planers, the cutter is carried by a clapper box which is pivotally mounted on a reciprocatable head. The clapper box permits the cutter to engage the workpiece during forward or cutting strokes of the head and enables the cutter to clear the workpiece during return or non-cutting strokes. Conventional clapper boxes have the disadvantage that they often cause chatter. An object of this invention is to provide, for a pattern controlled machine tool having reciprocatable parts, improved means for obtaining clearance of a cutter during the return strokes.

According to this invention, the tracer of a pattern controlled machine tool is provided with an extensible stylus for engaging the pattern. The supporting means for the tracer may be moved relative to the pattern by extending the stylus, and a cutter mounted on the supporting means is thereby moved relative to the pattern. Thus, where the supporting means are mounted on a reciprocatable head, the stylus may be extended during the return strokes of the head to move the cutter out of contact with the workpiece.

The invention is more particularly described with reference to the accompanying drawings, in which like reference characters designate corresponding parts and in which:

Fig. 1 is a partly broken away perspective view of the front portion of a horizontal shaper provided with tracers constructed in accordance with the invention; and Fig. 2 is a partly sectional plan view of a tracer mounted on a bracket of the shaper.

In Fig. 1, a shaper, upon which tracers constructed in accordance with this invention are mounted is generally indicated as 1; the shaper illustrated is described in detail in the co-pending application Serial Number 273,444, filed February 26, 1952 in the names of John Oliver Creek and Edward William Dawson, and the shaper will therefore be described only briefly here. The shaper has a frame 2, a horizontally reciprocatable block 3, and a vertically indexable knee 4 mounted at the front of the frame and carrying a table 5 which is adjustable longitudinally on guides 5a. The means for indexing the knee 4 vertically consists of a first gear 6 driven by the reciprocating mechanism (not shown) for the block 3, a second gear 7 driven by the gear 6, a shaft 8 connected eccentrically to the second gear 7 by a pin 8a and adapted by means of a pawl 8b, to turn a ratchet wheel 9 mounted on a shaft 10 which is journalled on the frame 2, the shaft 10 driving a lead screw mechanism (not shown) for elevating the knee 4. For each reciprocation of the block 3, the gears 6 and 7 make one rotation, causing the pawl 8b to turn the ratchet wheel 9 by an amount which is determined by the position of the pin 8a on the gear 7.

Mounted on the table 5 are three supports 11, 12 and 13 which are rotatable on trunnions, the trunnions 11a and 12a of the supports 11 and 12 being visible in Fig. 1. Connecting rods 14 on either side of the support 11 link the supports 11, 12 and 13 together so that they may be swivelled in unison. Each connecting rod 14 is parallel to a line joining the centers of the trunnions on which the supports linked by the rod are rotatable. For swivelling the supports, a cam 15 is mounted on a shaft 15a journalled on the table 5, and the cam engages a follower 11b on the support 11. A spring 16 anchored to the table 5 and to the support 11 ensures constant contact between the cam 15 and the follower 11b. The shaft 15a is driven through a flexible coupling 15b from reduction gears mounted in a housing 4a on the knee 4, said gears being driven by a shaft 17 journalled on the frame 2 and coupled to the shaft 10 by means of bevel gears 10a. The shaft 17 is splined to permit vertical movement of the knee 4 relative to the frame 2. Since the cam 15 is driven from the shaft 10, swivelling of the supports 11, 12 and 13 is coordinated with indexing of the knee 4.

A turbine blade workpiece 18 is mounted on the support 11 by means of a clamp 19 and a centre 20, with the longitudinal axis of the workpiece substantially parallel to the direction of reciprocation of the block 3. A pattern element 21 is mounted on the support 12 and a pattern element 22 is mounted on the support 13. The element 21 has a control surface 21a determinative of the desired shape of one side of the workpiece, the control surface facing in the same direction as said one side of the workpiece, and similarly the element 22 has a control surface determinative of the desired shape of the opposite side of the workpiece and facing in the same direction as said opposite side.

A head 23 is mounted on the forward end of the block 3 and is disposed above the supports 11, 12 and 13. Two brackets 24 and 25 are mounted on hinges 24a and 25b respectively on the head 23 and depend from the head on opposite sides of the workpiece 18 and of the pattern elements. The axes of the hinges are horizontal and are generally parallel to the direction of reciprocation of the head.

The brackets 24 and 25 at their forward ends support cutters 26 and 27 respectively, and at their rearward ends support tracers, that of the bracket 24 being generally indicated as 28, the tracers being constructed in accordance with this invention. For yieldably urging each tracer into engagement with a control surface of the pattern elements, a pneumatic cylinder is provided in a housing 30 for each bracket, each housing being suspended pivotally from the head 23, and in response to pneumatic pressure on a piston in the cylinder a piston rod 31, pivotally connected to the bracket by means of a pivot pin 31a, exerts a downward force on the bracket on which the tracer is mounted. If operating air is diverted to the lower side of the cylinder, the bracket may be rotated clear of the pattern elements and the workpiece to facilitate the inspection or removal of the cutters and the workpiece. Each housing 30 also contains a hydraulic damper which, through a rod 32 controls the rate of movement of the bracket. The rod 32 passes through a tab extension 31b of the pivot pin 31a and has a nut 32a above and below the tab extension. The upper nut 32a is normally urged into engagement with the tab extension 31b by means of a light spring 32b, so that there is a small gap between the lower nut 32a and the tab extension. This small gap provides sufficient free play for the tracer to follow accurately the contours of the control surface engaged by the tracer.

As the head 23 and the block 3 reciprocate, the tracers travel over the control surfaces and move the brackets 24 and 25 towards and away from the workpiece and the pattern elements, the brackets causing corresponding movement of the cutters 26 and 27 which travel over the workpiece to machine the workpiece to the desired shape.

As fully explained in the aforesaid co-pending application Serial Number 273,444, between cutting strokes of the shaper the knee 4 is indexed upwardly so that successively lower portions of the workpiece are machined, and in coordination with the indexing of the knee 4 the supports 11, 12 and 13 are swivelled by the cam 15 to maintain constant the incidence of the tracers to the pattern elements and of the cutters to the workpiece.

Each tracer has a stylus or follower 33 with a spherical tip 33a at one end for engaging a control surface of a pattern element. The stylus during a cutting stroke of the head 23 extends from the bracket a fixed distance so that the shape of the control surface is accurately reproduced on the workpiece. The stylus is fastened to a piston 33b reciprocatably mounted in a housing 34 which is rigidly secured to the bracket. Fluid can be admitted to or withdrawn from the housing and, as will presently be described, the admission of fluid causes the piston 33b to move in the housing, thus adjusting the position of the stylus relative to the bracket by extending the stylus a greater distance from the bracket than its original distance; on the other hand, withdrawal of fluid from the housing causes the piston and the stylus to return to their original positions. Fluid is admitted to or withdrawn from the housing by means of a fluid line 35 connected to a fluid pump (not shown) through a three-way valve 36 mounted on the block 3 and operable by a two-position lever 37. Adjustable abutments 38 and 39 are provided on the frame 2 to position the lever. At the end of a forward or cutting stroke of the block 3, the lever strikes the abutment 39 and operates the valve 36 to cause admittance of fluid through the line 35 to the housing 34. Upon admittance of fluid to the housing, the stylus extends to its greater distance from the bracket, moving the bracket away from the adjacent pattern element and thus moving the cutter out of engagement with the workpiece during the return stroke of the block 3. At the end of the return stroke the lever 37 strikes the abutment 38 and operates the valve 36 to cause withdrawal of fluid from the housing 34. Upon withdrawal of fluid from the housing the stylus retracts and the bracket returns to its original position, which it maintains during the next forward stroke of the block 3, with the cutter engaging the workpiece. Since the stylus is extended a greater amount during a return stroke than during a cutting stroke, the cutter clears the workpiece by a small amount during each return stroke and it is not necessary to use the usual clapper box normally employed on shapers.

The detailed construction of the tracer 28 is shown in Fig. 2, the tracers on each bracket being identical. The housing 34 is rigidly secured at one end to the bracket 24 by means of a retaining ring 34a which fits tightly into a cylindrical hole 24a in the bracket. At the other end the housing carries a micrometer sleeve 34b, and a hollow micrometer thimble 40 is threadably mounted in the micrometer sleeve. The stylus 33 is slidable through the ring 34a, and a stud 33c is secured to the stylus coaxially therewith at the end of the stylus remote from its spherical tip 33a. The stud 33c extends into the micrometer thimble, and the stud has a collar 33d which is engageable with a shoulder 40a of the thimble, thus limiting the possible axial travel of the stylus to the left relative to the bracket as viewed in Fig. 2. The piston 33b fits tightly around the stud 33c and has a cylindrical extension 33e which is slidable through an inner rim 34c of the housing 34. The end of the extension 33e is engageable with the shoulder 40a of the thimble, to limit the axial travel of the stylus to the right relative to the bracket. The piston 33b is reciprocatable in a chamber 34d which is closed at the end by the retaining ring 34a and the rim 34c. Through a port 34e the line 35 communicates with the chamber 34d on the right hand side of the piston 33b.

The stylus is shown in the position which it occupies during a cutting stroke of the shaper, with the end of the extension 33e engaging the shoulder 40a so that the stylus is as far to the right as it can move. When fluid is admitted to the chamber 34d through the line 35, the stylus is urged to the left causing the bracket to move to the right until the collar 33d engages the shoulder 40a. Movement of the bracket to the right increases the spacing between the bracket 24 and the pattern element 21 engaged by the tip 33a of the stylus. The piston rod 31 is constantly urging the bracket 24 towards the pattern element 21, and when the fluid is withdrawn from the chamber 34d the bracket returns to the position illustrated.

The position of the stylus relative to the bracket can be altered by adjusting the micrometer thimble 40; however adjustment of the thimble does not change the axial travel or stroke of the stylus, since this is governed by the distance between the collar 33d and the end of the extension 33e. Locking means (not shown) are provided to prevent the thimble from turning during operation of the shaper.

The embodiments of the invention herewith shown and described are to be taken as preferred examples of the same, and various changes in the shape, size and arrangement of the parts may be resorted to without departing from the scope of the subjoined claims.

What we claim as our invention is:

1. In a pattern controlled machine tool for machining a workpiece, in combination, mounting means for the workpiece and the pattern, a cutter for machining the workpiece, a tracer having a follower for engaging the pattern, and supporting means for the cutter and tracer, the supporting means being spaced from the pattern by the follower when engaging the pattern, one of the mounting means and the supporting means being controllably movable to cause the cutter and the follower to travel over the workpiece and the pattern respectively, and the supporting means being movable towards and away from the workpiece and the pattern whereby the follower upon travelling over the pattern moves the supporting means towards and away from the pattern and the supporting means thus causes movement of the cutter relative to the workpiece, the follower being adapted to occupy a fixed position relative to the supporting means to maintain a constant spacing between the supporting means and the pattern during machining of the workpiece, the follower also being adjustable in position relative to the supporting means and while engaging the pattern whereby the spacing between the supporting means and the pattern may be varied, thus controlling the position of the cutter relative to the workpiece.

2. In a pattern controlled machine tool for machining a workpiece, in combination, mounting means for the workpiece and the pattern, a reciprocatable head, supporting means mounted on the head and movable towards and away from the workpiece and the pattern, a cutter on the supporting means for machining the workpiece during a cutting stroke of the head, and a tracer on the supporting means and having a follower for engaging the pattern, the follower spacing the supporting means from the pattern during a cutting stroke, the follower by engaging the pattern causing movement of the supporting means relative to the pattern during a cutting stroke and the supporting means thus causing movement of the cutter relative to the workpiece, the follower while engaging the pattern being adjustable in position relative to the supporting means during a return stroke whereby the spacing between the supporting means and the pattern is varied during the return stroke and the cutter clears the workpiece during the return stroke.

3. In a pattern controlled machine tool for machining a workpiece, in combination, mounting means for the workpiece and the pattern, a cutter for machining the workpiece, a tracer having a follower for engaging the pattern, supporting means for the cutter and tracer, and means urging the supporting means towards the workpiece and the pattern, the supporting means being spaced from the pattern by the follower when engaging the pattern, one of the mounting means and the supporting means being controllably movable to cause the cutter and the follower to travel over the workpiece and the pattern respectively, and the supporting means being movable towards and away from the workpiece and the pattern whereby the follower upon travelling over the pattern moves the supporting means towards and away from the pattern and the supporting means causes corresponding movement of the cutter relative to the workpiece, the follower having piston means and while engaging the pattern being extensible in response to fluid pressure on the side of the piston means remote from the pattern, extension of the follower increasing the spacing between the supporting means and the pattern, thus varying the position of the cutter relative to the workpiece.

4. In a pattern controlled machine tool for machining a workpiece, in combination, mounting means for the workpiece and the pattern, supporting means movable towards and away from the workpiece and the pattern, a cutter on the supporting means for machining the workpiece, a tracer on the supporting means and having a follower for engaging the pattern, the follower having at least two positions relative to the supporting means, means urging the supporting means towards the pattern whereby the follower engages the pattern and is urged into one of said positions, the supporting means being spaced from the pattern by the follower when engaging the pattern, one of the mounting means and the supporting means being controllably movable to cause the cutter and the follower to travel over the workpiece and the pattern respectively, the follower upon travelling over the pattern moving the supporting means towards and away from the pattern, the supporting means thus causing movement of the cutter relative to the workpiece, and means for urging the follower into the other of said two positions while it engages the pattern, thus changing the spacing between the supporting means and the pattern.

5. In a pattern controlled machine tool for machining a workpiece, in combination, mounting means for the workpiece and the pattern, supporting means movable towards and away from the workpiece and the pattern, a cutter on the supporting means for machining the workpiece, a tracer having a reciprocatable follower for engaging the pattern and a non-reciprocatable part secured to the supporting means, the supporting means being spaced from the pattern by the follower when engaging the pattern, one of the mounting means and the supporting means being controllably movable to cause the cutter and the follower to travel over the workpiece and the pattern respectively, the follower upon travelling over the pattern moving the supporting means towards and away from the pattern, the supporting means thus causing movement of the cutter relative to the workpiece, means for reciprocating the follower while it engages the pattern to change the spacing between the supporting means and the pattern, and stop means on the follower and on the non-reciprocatable part to limit the stroke of the follower, the stop means on one of the follower and the non-reciprocatable part being movable to alter the position of the follower without altering the length of its stroke.

6. In a pattern controlled machine tool for machining a workpiece, in combination; mounting means for the workpiece and the pattern, supporting means movable towards and away from the workpiece and the pattern, a cutter mounted on the supporting means for machining the workpiece, a tracer having a housing mounted on the supporting means and a follower for engaging the pattern, the supporting means being spaced from the pattern by the follower when engaging the pattern, one of the mounting means and the supporting means being controllably movable to cause the cutter and the follower to travel over the workpiece and the pattern respectively, the follower upon travelling over the pattern moving the supporting means towards and away from the pattern, the supporting means causing corresponding movement of the cutter relative to the workpiece, the follower having piston means in the housing responsive to fluid pressure in the housing to extend the follower thus increasing the spacing between the supporting means and the pattern, stop means on the follower, a micrometer thimble mounted on the housing and having stop means engageable with the stop means on the follower to limit movement of the follower relative to the supporting means, the thimble being adjustable on the housing to move the stop means of the thimble relative to the supporting means.

References Cited in the file of this patent

UNITED STATES PATENTS

| Number | Name | Date |
|---|---|---|
| 1,677,131 | Cole et al. | July 17, 1928 |
| 2,026,893 | Henkes | Jan. 7, 1936 |
| 2,154,718 | Bannon | Apr. 18, 1939 |